(12) United States Patent
Ho et al.

(10) Patent No.: US 12,456,068 B1
(45) Date of Patent: Oct. 28, 2025

(54) QUANTUM MACHINE PERCEPTION

(71) Applicant: Google LLC, Mountain View, CA (US)

(72) Inventors: Alan Ho, Mountain View, CA (US); Guillaume Verdon, Mountain View, CA (US); Masoud Mohseni, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1165 days.

(21) Appl. No.: 17/019,564

(22) Filed: Sep. 14, 2020

Related U.S. Application Data (60) Provisional application No. 62/900,709, filed on Sep. 16, 2019.

(51) Int. Cl.
*G06N 10/60* (2022.01)
*G06N 3/045* (2023.01)

(52) U.S. Cl.
CPC ............ *G06N 10/60* (2022.01); *G06N 3/045* (2023.01)

(58) Field of Classification Search
CPC ........ G06N 10/00; G06N 10/60; G06N 10/80; G06N 10/70
See application file for complete search history.

(56) References Cited

U.S. PATENT DOCUMENTS

| | | | | |
|---|---|---|---|---|
| 10,007,885 B1 * | 6/2018 | Gorshkov | ............ | G01N 24/008 |
| 2015/0055961 A1 * | 2/2015 | Meyers | ................ | H04L 9/0855 398/140 |
| 2017/0017894 A1 * | 1/2017 | Lanting | ................... | G06F 15/82 |
| 2019/0005402 A1 | 1/2019 | Mohseni et al. | | |
| 2020/0050959 A1 * | 2/2020 | Ashrafi | ................ | H04L 9/0852 |
| 2020/0097848 A1 * | 3/2020 | Woerner | ............... | G06F 9/5027 |
| 2020/0272930 A1 * | 8/2020 | Aspuru-Guzik | ......... | G06N 3/06 |
| 2021/0294680 A1 * | 9/2021 | Palmer Da Silva | ... | G06N 10/00 |

FOREIGN PATENT DOCUMENTS

WO    2018223037 A1    12/2018

OTHER PUBLICATIONS

Verdon et al., "A Universal Training Algorithm for Quantum Deep Learning," arXiv (2018) (Year: 2018).*

(Continued)

*Primary Examiner* — Kakali Chaki
*Assistant Examiner* — Kevin L. Smith
(74) *Attorney, Agent, or Firm* — Botos Churchill IP Law LLP (57) ABSTRACT

The technology relates to enhancing performance of quantum sensor operation in a noisy environment. Quantum neural networks are used to pre- and post-process analog signals to which qubits of a quantum sensor are exposed. Intra-processing using additional quantum neural networks may also be employed. This approach filters out noise from both the input analog signal and the system itself to achieve a very high signal to noise ratio. This permits the system to detect induced dynamics associated during exposure of the qubits to the analog signals. This enables the quantum sensor to sense a change in a state of a system under test, which can be beneficial for areas such as imaging, magnetometry, sensing electric fields, optomechanical sensors, quantum radar and other areas where enhanced signal to noise ratios are desired.

21 Claims, 6 Drawing Sheets

(56) References Cited

OTHER PUBLICATIONS

Michael Cuffaro, "On the Necessity of Entanglement for the Explanation of Quantum Speedup," arXiv (2018) (Year: 2018).*

Qiu et al., "Detecting Entanglement With Deep Quantum Neural Networks," IEEE (Jul. 2019) (Year: 2019).*

Qi Yu, "On hybrid quantum filtering and capability of quantum sensors," UNSW Canberra (Sep. 2, 2019) (Year: 2019).*

Degen et al., "Quantum Sensing," arXiv (2017) (Year: 2017).*

Bardin, Joseph C., et al., A 28nm Bulk-CMOS 4-to-8GHz <2mW Cryogenic Pulse Modulator for Scalable Quantum Computing, IEEE, 2019, pp. 1-13.

Chen, H., et al., Universal discriminative quantum neural networks, arXiv:1805.08654v1, May 22, 2018, pp. 1-19.

Farhi, Edward, et al., Classification with Quantum Neural Networks on Near Term Processors, Center for Theoretical Physics, Google Inc., Massachusetts Institute of Technology Cambridge, MA, arXiv:1802.06002v2, Aug. 30, 2018, pp. 1-21.

Verdon, Guillaume, et al., Learning to learn with quantum neural networks via classical neural networks, Google LLC, arXiv:1907.05415v1, Jul. 11, 2019, pp. 1-12.

Behrman, E C, et al., "Quantum neural computation of entanglement is robust to noise and decoherence", arXiv:1510.09173v2 [quant-ph] Nov. 9, 2015, pp. 1-34.

Behrman,, E C, et al., "A Quantum Neural Network Computes Entanglement", arXiv:quant-ph/02021312002, 2002, 8 pages.

* cited by examiner

QUANTUM MACHINE PERCEPTION

CROSS-REFERENCE TO RELATED APPLICATIONS

This application claims the benefit of the filing date of U.S. Provisional Application No. 62/900,709, filed Sep. 16, 2019, the entire disclosure of which is incorporated by reference herein.

BACKGROUND

Quantum sensors are devices configured to respond to one or more input signals in order to perform a measurement of a physical quantity associated with such signals. This can be done via quantum entanglement or quantum coherence. As a quantum sensor interacts with an input signal, it has some response to the signal. This response can be used to provide information about the input signal, which can be beneficial in a wide variety of applications.

For instance, a quantum sensor may comprise several qubits that utilize particular forms of highly correlated quantum states to become very sensitive to fluctuations of certain classical fields beyond what is possible by a classical device. Quantum entanglement may enable a quadratic enhancement of sensitivity relative to a classical approach. Greenberger-Horne-Zeilinger (GHZ) states (cat states) can be employed to create multipartite entanglement between qubits in order to increase the sensitivity to phase shift signals. However, noise in the input signal or noise associated with the quantum sensor architecture itself may adversely impact the entanglement or otherwise degrade system performance.

BRIEF SUMMARY

The technology relates to quantum sensors and quantum neural networks, including enhancing performance of quantum sensors in noisy environments. In particular, a quantum neural network (QNN), which is a set of instructions for a sequence of parametrized quantum gates, is used to pre- and post-process analog signals to which the quantum registers (qubits) of a quantum sensor are exposed. The qubits are exposed to both a signal of interest and noise. The pre- and post-processing is designed to enable the system to be maximally sensitive to the signal of interest while rejecting or being resistant to the noise in the analog signal and noise associated with the sensing system.

According to aspects of the technology, quantum sensors comprising a set of qubits utilize certain forms of highly correlated quantum states to become very sensitive to fluctuations of certain classical fields (e.g., magnetic, electric, electromagnetic, gravitational or optical). The technology is applicable to sensing and the intersection of computing and sensing. By way of example, this can be particularly beneficial in functional magnetic resonance imaging (fMRI) and other imaging-related fields, although the technology is not limited to this. It has applicability to magnetometry, sensing electric fields, optomechanical sensors, gravitometers, accelerometers, quantum radar and other areas where enhanced signal to noise ratios are desired.

In one aspect, a method of performing processing using a quantum processing unit is employed. The method includes performing pre-processing on a set of qubits of the quantum processing unit based on one or more variational parameters of a first quantum neural network. The first quantum neural network is selected to prepare entangled states that are sensitive to a signal of interest. After pre-processing, the set of qubits is exposed to an analog signal that includes the signal of interest and noise. The method also includes performing post-processing on the set of qubits based on one or more variational parameters of a second quantum neural network. The post-processing filters out at least some of the noise of the analog signal and outputting a filtered signal. The method further includes detecting induced dynamics associated with exposing the set of qubits to the analog signal based on the filtered signal, and using the detected induced dynamics to sense a change in a state of a system under test.

In one example the pre-processing includes setting the first quantum neural network to a starter state. The starter state may be a state selected to be most natural for the quantum processing unit.

In another example, the exposing introduces additional noise that is correlated between qubits. Here, the second quantum neural network is selected to exploit any correlation to isolate and amplify the signal of interest while filtering out at least some of the noise including the additional noise.

The second quantum neural network may be selected to be different from the first quantum neural network.

In a further example, exposing the set of qubits to the analog signal includes performing one or more intra-processing exposure phases. The one or more intra-processing exposure phases may include performing multiple exposures of the qubits to the analog signal. The one or more intra-processing exposure phases may be a plurality of intra-processing exposure phases, where each intra-processing exposure phase utilizes a different quantum neural network. And the one or more intra-processing exposure phases may each apply a different filter to the analog signal.

In another example, the method further comprises training the first and second quantum neural networks in accordance with one or more training signals. Here, the training may include defining a loss function associated with one or more hidden parameters of a selected signal. The first and second quantum neural networks may be trained concurrently. And the training may be performed according to a classical optimization process.

Furthermore, the set of qubits may include a group of computational qubits and a group of sensing qubits.

In accordance with another aspect, a quantum processing system is provided. The system includes a first quantum neural network selected to prepare entangled states that are sensitive to a signal of interest and a second quantum neural network. It also includes a quantum processing unit having a plurality of qubits. The plurality of qubits are configured for pre-processing based on one or more variational parameters of the first quantum neural network. After pre-processing, the qubits are configured for exposure to an analog signal including the signal of interest and noise and then to post-processing based on one or more variational parameters of the second quantum neural network. The post-processing filters out at least some of the noise of the analog signal and outputs a filtered signal. The quantum processing system is also configured to detect induced dynamics associated with exposing the set of qubits to the analog signal based on the filtered signal, and use the detected induced dynamics to sense a change in a state of a system under test.

In one example, the second quantum neural network is selected to exploit any correlation to isolate and amplify the signal of interest while filtering out at least some of the noise including the additional noise.

In another example, the second quantum neural network is selected to be different from the first quantum neural network.

In a further example, the plurality of qubits includes a group of computational qubits and a group of sensing qubits different than the group of computational qubits.

And in yet another example, the quantum processing system is configured to train the first and second quantum neural networks in accordance with one or more training signals.

DETAILED DESCRIPTION

Overview

Aspects of the technology employ a quantum probing method so that a quantum machine perception system learns, through an iterative process, to gain maximum sensitivity to an input analog signal based on non-local quantum correlations. This approach can be implemented using a quantum processing unit (QPU) of a quantum computer. For purposes of this disclosure, a quantum computer includes any form of quantum memory over which the designer has sufficient control and which demonstrates quantum coherence. By way of example, any architecture that satisfies the DiVincenzo criteria would be considered a quantum computer.

There is a notion of the maximum amount of information about a hidden parameter that one can extract from a noisy quantum evolution. This information about a hidden parameter in a quantum system is known as Quantum Fisher information. It is known to be bounded by the so-called Cramer-Rao bound. In some cases, the approaches discussed herein could achieve this theoretical bound in principle. In other cases, a design goal may be to have high information content about the parameter(s) from a signal of interest.

Figure 1:
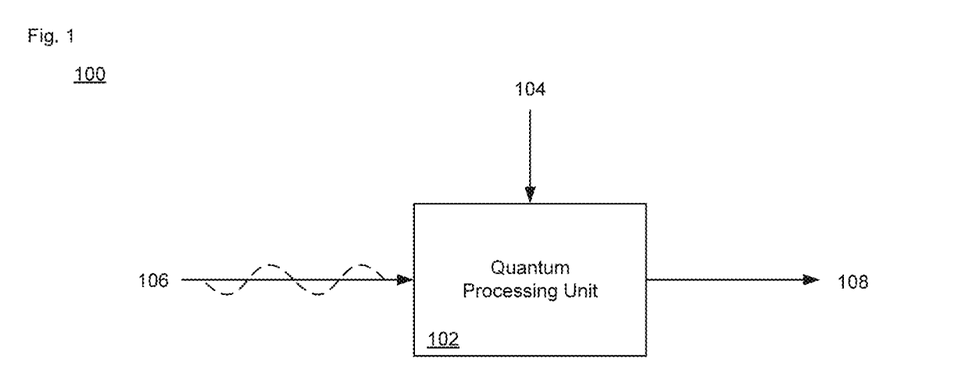
FIG. 1 illustrates an example quantum processing unit arrangement in accordance with aspects of the technology.

FIG. 1 illustrates a generalized example 100 of a quantum sensor system, which includes a quantum processing unit (QPU) 102 that receives one or more variational parameters 104. The variational parameters are used in pre- and post-processing phases with one or more sets of qubits of the quantum processing unit 102. The qubits of the quantum processing unit 102 are exposed to an analog input signal 106. The analog input signal includes both a signal of interest and noise. In response to the exposure, and based on pre- and post-processing of entangled quantum states associated with the exposure, the quantum processing unit 102 generates one or more output signals 108, such as a signal classification label, that provide maximal sensitivity to the signal of interest.

The analog input signal 106 influences the dynamics of one or more qubits of the QPU 102. The qubits are affected by both the desired input signal itself and noise. Some of the noise is inherent in the analog signal. Other noise may be introduced during the pre- and/or post-processing phases, for instance because most quantum computer architectures can have a noisy form of processing. Furthermore, control errors can also introduce noise during the exposure process. Finally, there may also be noise during the measurement process at the end of the procedure, which will carry over to the classical data of the readout.

In one example, the QPU 102 is configured in pre- and post-processing phases according to the variational parameters of selected quantum neural networks (see FIG. 2, described below). A quantum neural network comprises a sequence of parametrized quantum gates that are applied to the qubits. The parameters of the quantum neural network(s) are determined variationally in a training scheme prior to the exposure phase. A pre-processing QNN is applied to qubits to prepare entangled states that are sensitive to a particular type of analog signal. Then the analog signal 106 is input or otherwise applied to the qubits during the exposure phase. By way of example, the analog signal may be a microwave signal piped to the QPU chip.

The pre- and post-processing quantum neural networks are selected and trained to prepare entangled states for the qubits that are sensitive to the signal of interest while being robust (relatively insensitive) to the noise. The QNNs in general will be noise-resistant. For instance, the system can learn an optimal QNN via classical optimization tasked with optimizing the signal to noise ratio for input signals measured via test signals. Such test signals can form a training set of data, and the system can employ the training set to select an optimal QNN.

A quadratic enhancement of sensitivity may be achieved using maximal quantum entanglement as explained further below. As noted above, GHZ states (cat states) may create multipartite entanglement between qubits. The qubits themselves may have different forms depending on the hardware platform employed for the quantum processing unit. Examples of hardware platforms include but are not limited to superconducting qubits (e.g. transmon or Gmon qubits) or ions stabilized with lasers (so called trapped ions).

As discussed further below regarding FIG. 2, the pre-processing phase involves preparing the GHZ state using a first QNN. Another signal is obtained by coupling the qubits to the analog input signal (a classical field, such as a radio frequency or other electromagnetic signal in a cavity/control line on a superconducting chip) to generate a fractional rotation (phase shift) of each qubit by a value depending on the amplitude (or some other property/quantity) of the field. Other types of induced dynamics may also be observed. The dynamics are a change in a state or property of the qubit.

General closed system (noiseless) dynamics include any sort of time evolution under Schrodinger dynamics generated by a certain Hamiltonian. The differential equation describing this evolution is the time-dependent Schrodinger equation:

$$\frac{d}{dt}|\psi(t)\rangle = -i\hat{H}|\psi(t)\rangle \quad \text{(Eq. 1)}$$

where $\hat{H}$ is the so-called Hamiltonian. For noisy systems, the evolution may best be described by the so-called Lindblad master equation:

$$\frac{d}{dt}\rho = -i[\hat{H}, \rho] + \sum_{n,m} h_{nm}\left(A_n \rho A_m^\dagger - \frac{1}{2}\{A_m^\dagger A_n, \rho\}\right) \quad \text{(Eq. 2)}$$

where $\hat{H}$ is the Hamiltonian, the $A_n$ operators are the so-called Lindblad jump operators representing occurrences of noise, and ρ is the density matrix.

The entanglement signal collected by coupling the qubits (whichever form they may take depending on the hardware platform) to the electromagnetic field (e.g. a radio-frequency signal in a cavity/control line on a superconducting chip) is subject to a post-processing phase. In the post-processing phase, another quantum neural network is used to quantum-coherently collect the entanglement signal into a subset of qubits such as to amplify the obtained signal and (partially or fully) filter out the noise.

The post-processing QNN can be selected to be different from the pre-processing QNN. The post-processed filtered signal is then measured or otherwise read out as output signals 108, and the results can be employed for sensing or other tasks. Performing both pre- and post-processing with the quantum neural network allows for both encoding and decoding of quantum information to optimize the sensitivity of the readout to the signal while minimizing exposure to noise. Because the desired input signal and noise can have different correlation structures and different amplitudes, the approach using the quantum neural networks allows for automation of calibration of the sensing pre- and post-processing steps without the need to classically characterize the profiles of the signal or the noise. Theoretically one could estimate the parameters of the noise (Linblad operators) using classical statistics one the results from simple measurements of the device. However, in practice this may require many measurements to resolve these statistics. Thus, classical characterization of the profiles may be inefficient or unfeasible.

Example Implementations

Figure 2:
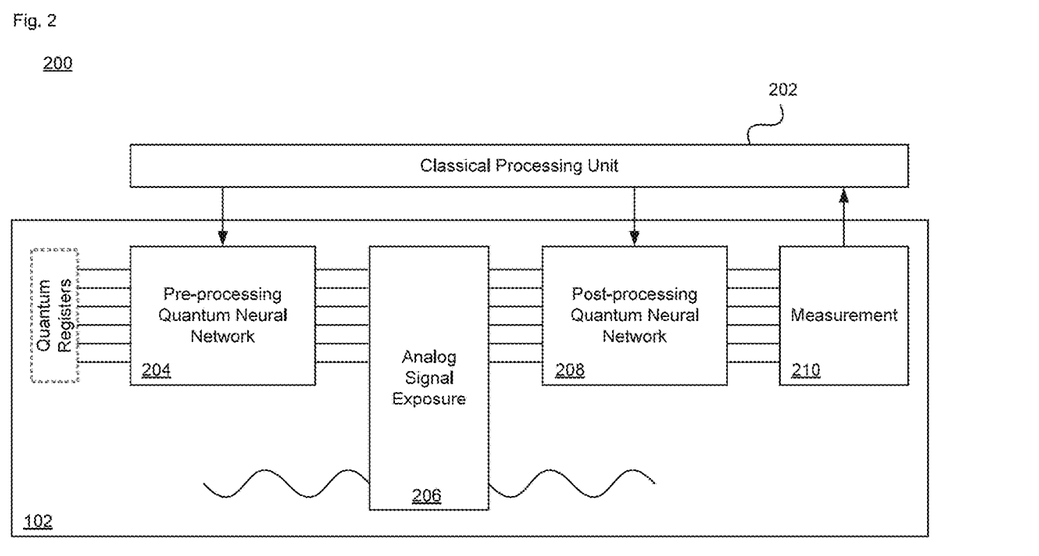
FIG. 2 illustrates a functional arrangement for a quantum processing unit in accordance with aspects of the disclosure.

FIG. 2 illustrates an example functional arrangement 200 for, e.g., quantum processing unit 102 of FIG. 1. Here, a classical processing unit 202 of one or more processing devices is operatively coupled to the quantum processing unit, which includes one or more sets of qubits (quantum registers). The qubits (or one set of qubits) is configured in the pre-processing phase according to the parameters of a first QNN as shown in block 204. For example, a first sequence of parameterized quantum gates using a first set of learned parameters is applied to the qubits. Prior to the application of the first QNN, the qubits are prepared in a known initial state. Then as shown by block 206, these qubits are exposed to an input analog signal, which includes a signal of interest and any noise associated with the analog signal.

The result from block 206 is a signal embedded in the exposed qubits' state, which is subject to a post-processing phase at block 208 based on the parameters of a second QNN. For example, a second sequence of parameterized quantum gates using a second set of learned parameters is applied to the qubits after they have been exposed to the input analog signal in order to generate a processed signal. The processed signal is provided to the measurement phase 210, which generates one or more output signals, such as a signal classification label. The output signal may be generated based on measurements of one or more of the qubits. As noted above, the first and second QNNs may be different, for instance trained using different data sets in view of the signal of interest. The output signal(s) include information relevant to the signal of interest. An example of an output signal can be generally any function of the hidden parameter in the signal. More concretely, for instance, the output can be a classification label (e.g., a binary or categorical index) that labels which kind of signal was present (the label is in accordance to how the QNN was trained). A simple example is whether the analog signal stayed constant (labelled as output "0") or if there was a fluctuation in the average electromagnetic amplitude of the signal (labelled as output "1"). More generally, the expectation value of a functional of the classical measured output of the qubits can yield continuous values, thus allowing for regression of hidden parameter values. Thus, the output signal can be a binary label (binary classification), a categorical index for several possible categories (multicategory classification), or a continuous parameter value (regression).

Configuring the qubits in the pre- and post-processing phases includes applying the variational parameters and compiled circuit instructions associated with the respective quantum neural network. One example of such parametrized basic operations on qubits could be gates of the form of:

$$U_{\vec{\theta}} = \bigotimes_j e^{-i\theta_j \vec{X}_j} \text{ or } U_{\vec{\theta}} = e^{-i\vec{\theta} \vec{Z}_j \vec{Z}_k} \quad \text{(Eq. 3)}$$

although other forms can be used depending on the type of quantum device employed.

For example, the gates may be of the form:

$$U_l(\theta_l) = \exp(i\theta_l \Sigma_l P_l), \quad \text{(Eq. 4)}$$

where the $P_l$ are generalized Pauli operators acting on one or more qubits. In other words, $P_l$ is tensor product of operators from the set $\{\sigma_x, \sigma_y, \sigma_z\}$ that acts on one or more qubits in the plurality of qubits.

As seen in blocks 204, 206 and 208 of FIG. 2A, the three operational phases (stages) for the general approach are (i) pre-processing, (ii) signal exposure of the qubits, and (iii) post-processing. As indicated above, the pre-processing involves configuring the QPU based on the variational parameters of a first quantum neural network. This includes setting the system (e.g., the qubits) to a "blank" starter state prior to application of the first QNN, which can be a state that is most natural for the QPU. For instance, starting states are often choosing to be the "relaxed" state of the device. In quantum computing, it is standard to take and unentangled product state, namely the |00000 . . . > state, although other states may alternatively be used.

The exposure phase at block 206 evolves the qubits through their interactions with the analog signal via the cavity (signal carrier). The evolution is performed under some (possibly time-dependent) Hamiltonian describing the joint dynamics of the qubits and signal carrier (see example FIG. 3). The Hamiltonian may be expressed as:

$$\hat{H}(t) = \hat{H}_{carrier}(t) + \hat{H}_{qubits}(t) + \hat{H}_{interaction}(t) \quad \text{(Eq. 5)}$$

Each of the Hamiltonian terms may be controllable (dependent on certain parameters with which we can influence the behavior/values of these operators). The exposure phase can itself be variationally controlled or not.

The exposure phase can naturally or artificially have some noise added to the dynamics. In cases where this added noise is correlated between qubits, the post-processing phase at block 208 can employ the second quantum neural network to exploit such correlation to isolate and amplify the input signal while filtering out parts of the noise.

The post-processing phase allows for concentration of the input signal onto a subset of qubits. This can be done via coherent quantum computation. For example, a phase kickback procedure accumulates phase shifts, thereby performing a quantum-coherent amplification of the signal. The result of this phase at block 208 is a post-processed filtered signal, which is obtained by measuring some or all of the qubits of the QPU. In particular, the information of the post-processed filtered signal may be a sequences of bitstrings of measurement results of the output of the quantum neural network.

In some cases additional qubits can be measured to detect and infer what noise the QPU was subject to for a given run. For instance, one could optimize a classical neural network jointly with a QNN to learn the optimal decoding (inference of error and correction procedure) algorithm. This can be done on the classical processing unit 202. This noise-related information may be used in a quantum error detection operation. For instance, a machine learning-based inference can be employed to detect and correct certain errors. This process may take place on the classical processing unit device and uses classical neural networks fed the measurement results output by the quantum neural network. Both the QNN and the classical neural network can be trained simultaneously for optimal joint performance of inference.

According to one aspect of the technology, a single pre- and post-processing quantum neural network pair may be employed. According to another aspect of the technology, multiple pairs of quantum neural networks could be used in pre- and post-processing for use over multiple repetitions/iterations of the exposure phase. This may be advantageous in cases where several queries can be made, providing multi-channel quantum machine perception. In particular, different quantum neural network pairs effectively apply different filters to the analog signal. This allows for more information about the input signal to be captured in some cases.

By way of example, a multi-exposure quantum machine perception process may be employed. In this general form of the process/method, there are is a pre-processing step, several rounds of exposure and intra-processing steps, and finally the post-processing and measurement steps. The pre-processing and post-processing steps each employ a quantum neural network as described previously.

As with the pre- and post-processing QNNs discussed above, each intra-processing QNN is also a learnable parameterized set of quantum operations that can be trained to optimize the signal-to-noise ratio on a test set of signals. In principle, one can apply several rounds of exposure and intra-processing QNN's. At each round, the exposure qubits are transferred to a location in the system which is suitable for exposure. This location may be on the same quantum chip, a different subsystem in the same quantum processor, or an ancillary system connected to the QPU via a quantum interconnect (quantum channel of communication). These qubits are then exposed to the signal and then routed back for subsequent phases of the processing.

Figure 3:
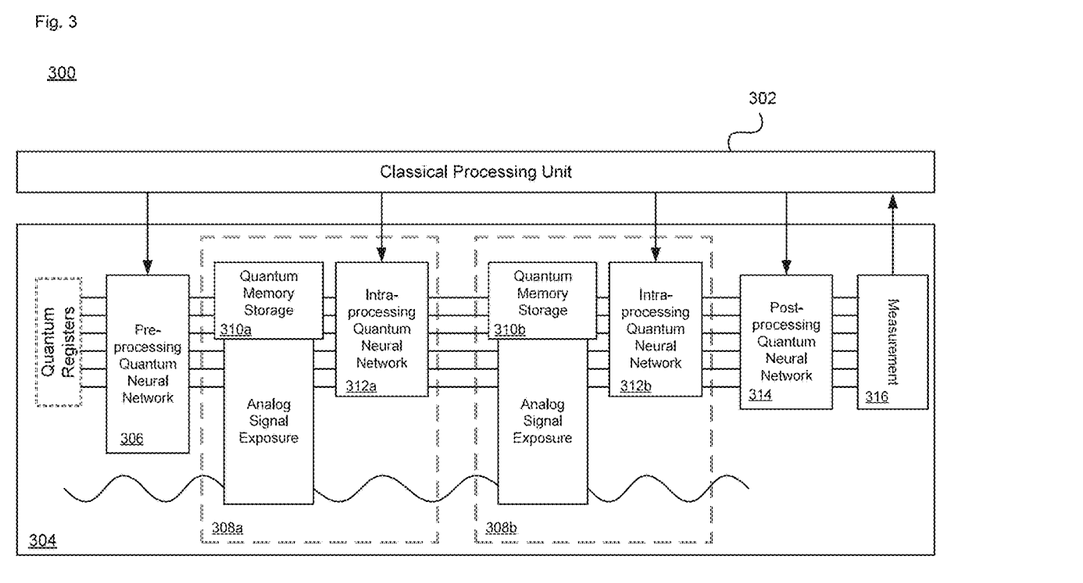
FIG. 3 illustrates a functional arrangement employing intra-processing quantum neural networks in accordance with aspects of the disclosure.

Provided in FIG. 3 is an example operational diagram 300 of the above described multi-exposure scheme. Here, a classical processing unit 302 of one or more processing devices is operatively coupled to quantum processing unit 304, which includes one or more sets of qubits (quantum registers). The qubits (or one set of qubits) is configured in the pre-processing phase according to the parameters of a first QNN as shown in block 306. Then, as shown by block 308a, at a first intra-processing phase these qubits are exposed to an input analog signal, which includes a signal of interest and any noise associated with the analog signal. In particular, exposure occurs at block 310a, and storage of the information associated with that exposure occurs at block 312a. Intra-processing of the stored qubit information occurs at block 312a.

By way of example, a subset of the qubits may be exposed to the signal and the remainder stored in registers (quantum storage memory) and not to be exposed to the input analog signal. As the exposure qubits may have to be swapped onto the exposed registers while the stored qubits can be kept safe from exposure, in general one may expect there to be less noise on the storage qubits. According to theoretical results on quantum illumination, it may be expected that holding in memory (storage) a subset of qubits while sending another set of qubits (which can be quantum-entangled with the storage qubit) to be exposed to the signal can yield boosts in signal-to-noise ratio.

The results of this interim processing phase are passed to a next phase 308b. Here, the qubits are exposed to the input analog signal and the results of the intra-processing from block 312a. The results of this exposure phase are stored in quantum memory storage 310b, and the results from here are subject to intra-processing in accordance with another QNN at block 312b. While only two intra-processing phases 308a and 308b are shown, any number of intra-processing phases may occur. At the end of intra-processing, the resultant quantum-state-embedded signal is subject to a post-processing phase at block 314 based on the parameters of another QNN. A processed signal is provided to the measurement phase 316, which generates one or more output signals, such as a signal classification label. In general, the QNNs for different intra-processing phases need not be identical in architecture or parameter values.

During any execution (whether for testing or inference or a real signal) one can expect there to be noise. The approaches discussed herein should adapt themselves to minimize statistical error by construction by maximizing the signal to noise ratio. Several repetitions might not make the results more robust, but will yield more information about the signal and hence boost the signal to noise ratio. Selection of which quantum neural network pair to apply at each iteration can be chosen, e.g., by some stochastic (probabilistic) rule, deterministic, a classical neural network, etc. For instance, one can use classical optimization for search over QNN architectures in order to select the QNNs to employ.

Training of each quantum neural network can be performed using various training signals. These training signals may be artificially generated (e.g., via a waveform generator) or from a dataset of signals. Training includes first defining a loss function of the form:

$$L(\theta) = \frac{1}{N}\sum_j L_j(\psi_\theta, S_j) \qquad \text{(Eq. 6)}$$

The loss function $L(\theta)$ depends on both the parametrized output quantum state $\psi\theta$ of the quantum neural network and the given set of analog signals $\{S_j\}^n_{j=1}$. The loss function captures how well the quantum neural network was able to extract the (known) hidden parameter(s) in the signal (e.g., a class label, average signal amplitude, or other desired property).

The loss function may be computed from expectation values of a (vector) of observables at the output: $\vec{h}_\theta = \{(\vec{h}_k)_\theta\}_{k=1}^M$. Each of the observables $\vec{h}_k$ can be an n-qubit observable, such as multi-local Pauli (e.g., $X1 \otimes Z2 \otimes Y3$), or the projector onto certain bitstring (e.g. $|010\rangle\langle010|$). Thus, the loss terms over the jth datum is computed as $L_j(\psi\theta, S_j)=L_j(\vec{h}_\theta, S_j)$. The specific choice of loss function $L(\theta)$ to characterize the success of classification can be adapted to the particular problem at hand. By way of example, for regression tasks this can be the mean square loss between the hidden parameter (e.g., the known value of the parameter) and the output parameter (e.g., the value of the parameter output determined based on the result(s) of the measurement phase). For a classification task, for example, the cross entropy or the Kullback-Leibler divergence can be used between the desired (e.g., the known) label and the label inferred by the quantum neural network given the corresponding signal input. Note that, without loss of generality, one can also have a classical neural network, which can be denoted as $f\eta$ ($\eta$ being the parameters of the classical neural network), which takes as input $\vec{h}_\theta$ and computes some output $f_\eta(\vec{h}_\theta)$. The loss function can then be computed as $$L(\theta, \eta) = \frac{1}{N}\sum_j L_j\left(f_\eta(\vec{h}_\theta), S_j\right).$$

Once the loss function is defined, the pre- and post-processing (and any intra-processing) quantum neural networks are trained. Pre- and post-processing and/or intra-processing quantum neural network pair(s) may be trained simultaneously. This may be done, for instance, by using a classical optimization algorithm tasked to find approximate minima of the loss function subject to variations of the parameters. In particular, the optimization algorithm finds argmin $\theta$ $L(\theta)$. This optimization algorithm can be a gradient-based method (such as stochastic gradient descent, or the Adam optimizer) or gradient-free (such as L-BFGS, Nelder-Mead, etc.), or any other choice of classical optimization algorithm.

For gradient-based methods, in the case where a classical neural network is employed, classical backpropagation may be used to obtain the gradient of the loss function with respect to the vector-valued quantum neural network output, $$\vec{g}_k = \frac{1}{N}\sum_j \partial_{\theta_k} L_j\left(f_\eta(\vec{h}_\theta), S_j\right).$$

This gradient is then used to define an effective cost function for the quantum neural network $\vec{g} \cdot \vec{h}_\theta$. Then the gradients of this effective cost function are employed to have effectively a gradient-based optimization strategy for both the quantum and classical neural networks as one parameterized differentiable processing procedure that can be optimized jointly by finding the argmin$_{\theta,\eta}$ $L(\theta,\eta)$ by optimizing both pre- and post-processing networks with gradient-based methods.

Regardless of the optimization method, training of each quantum neural network may require multiple runs (QPU executions with the input analog signal) to estimate the loss function sufficiently accurately to allow for the classical optimizer to find parameters with a low-loss value. This may involve making multiple runs to allow the training to converge to a low loss value/high signal to noise ratio QNN.

The training process results in a set of quantum neural network parameters ($\theta^*$) which sufficiently minimize the loss function. Based on this, the quantum neural networks can be used for inference of new signals that were not part of the training set. This can be done by applying a given quantum neural network to new signals with the parameters fixed at $\theta^*$. The result at this point is a calibrated QNN device for classification/detection of signals and filtering of noise.

Figure 4:
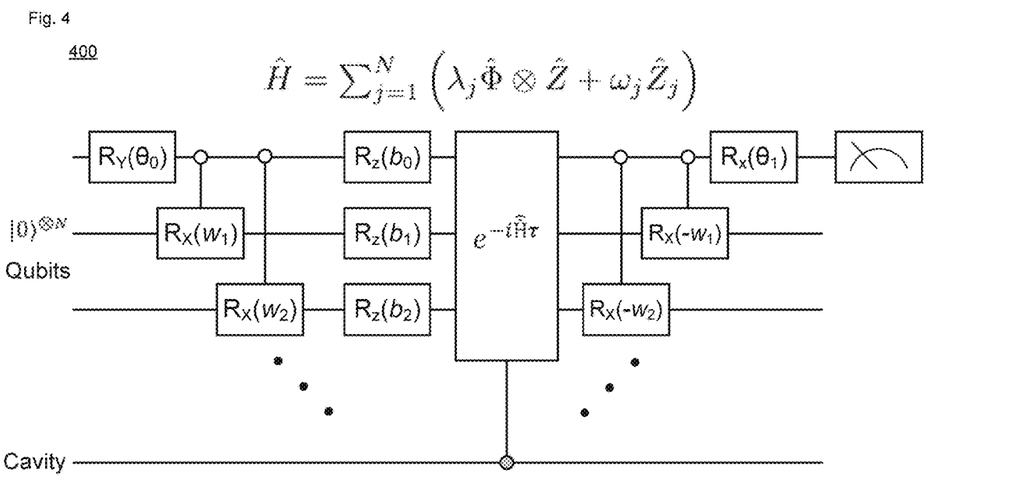
FIG. 4 illustrates an arrangement for an example quantum circuit and an interaction Hamiltonian in accordance with aspects of the disclosure.

A sample use case of the system involves the detection of fluctuations of a DC signal (constant in time for some time). By way of example, this could be for the measurement of electric and/or magnetic field amplitude. FIG. 4 illustrates an arrangement 400 for an example quantum circuit and the interaction Hamiltonian between the analog signal from the cavity and the qubits of the QPU.

Here, $R_P(\theta)=e^{-i\theta P}$ for P=X, Y, Z. The controlled Rx is a controlled version of the gate which applies the rotation on the target bit conditioned on the control bit, akin to a standard CNOT gate. The gates could be implemented directly via optimal control or via compilation to equivalent circuits. Instead of having one register as control, with multiple registers as targets for controlled operations, one could employ gates in a hierarchical tree-like structure instead. Some hardware implementations of the registers may restricted to local interactions only. In this case one would need swap gates to move the qubits around in order to couple non-neighboring qubits.

FIG. 4 illustrates an example of an interaction Hamiltonian with the cavity. The $\hat{\Phi}$ is an operator for a certain observable of the signal. This could be the number of photons, the amplitude of the electromagnetic field in a given direction, or any other quantum number describing the input signal. In this particular example, one may wish to detect fluctuations (above/below some baseline value) in the value of $\hat{\Phi}$ of the analog signal through interaction with the qubits, which are prepared in a variational pre-exposure state, and for which the system has a variational post-processing circuit.

In the above case, the signal becomes encoded as phase shifts, i.e. the effective operation representing the exposure phase is given by $$U=e^{-iHt}=\Sigma_n|\Phi_n\rangle\langle\Phi_n|\otimes U_n=\otimes_j e^{-i\alpha_{nj}Z_j} \quad \text{(Eq. 7)}$$

where the $|\Phi_n\rangle$ are eigenstates of the signal observable and $\alpha_{nj}=\omega_j+\lambda_j\Phi_n$ are the phase shift coefficients which encode the hidden value $\Phi_n$.

If the "baseline" (background) value is considered $\Phi^*$, the goal of the above QNN is to output a 1 (as a classical measurement result) as often as possible when there is a fluctuation about this value, such as in the cases where the measured $\Phi_n=/\Phi^*$, and 0 (as often as possible) in the case where the input signal is exactly at amplitude $\Phi^*$. In general, there can be a time-dependent interaction between the analog signal carrier (called "cavity" above) and the qubits (or more generally, the computational quantum degrees of freedom).

Figure 5:
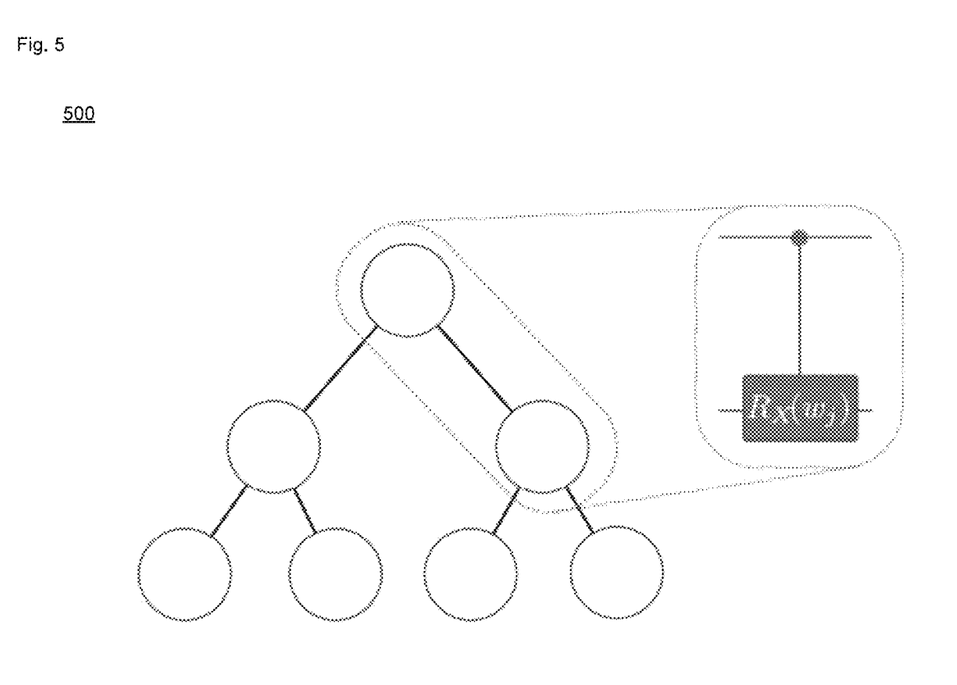
FIG. 5 illustrates a hierarchical example in accordance with aspects of the disclosure.

In the case of a hierarchical network, instead of one-to-all adder, (controlled-Rx's), the ansatz can be converted to a hierarchical form where we perform these operations in a hierarchy, as shown in example 500 of FIG. 5. This essentially forms a k-ary tree of adders, with an O(n log n) gate count instead of O($n^2$). This approach still allows phase kicks (signals in this case) to accumulate to a parent/collector node. In some instances one can cut off the network after a few layers of the hierarchy and leave the rest to a classical network/classical statistics, for instance have the lower levels be quantum and the higher levels of the collection be classical, using classical neural network building blocks.

In one alternative, the quantum sensing and the quantum processing qubits may be different qubits. For instance, in one example the computational qubits can be used for the state preparation, such as shown above with regard to FIG. 3. Logical qubits may be swapped (via swap gates or any other form of quantum state transfer channel) to a set of sensing qubits, which are specialized to have a certain Hamiltonian during the exposure. After the exposure, the logical qubits can be transferred back to the computational registers (again via a quantum channel or swap gate in the case of living on the same chip to perform the post-processing step". This approach may be employed where the signal exposure and pre/post-processing steps occur in different parts of a device or different devices entirely. Also, the systems and methods described herein may employ different quantum devices with different sets of qubits that could be connected via a quantum channel.

Figure 6:
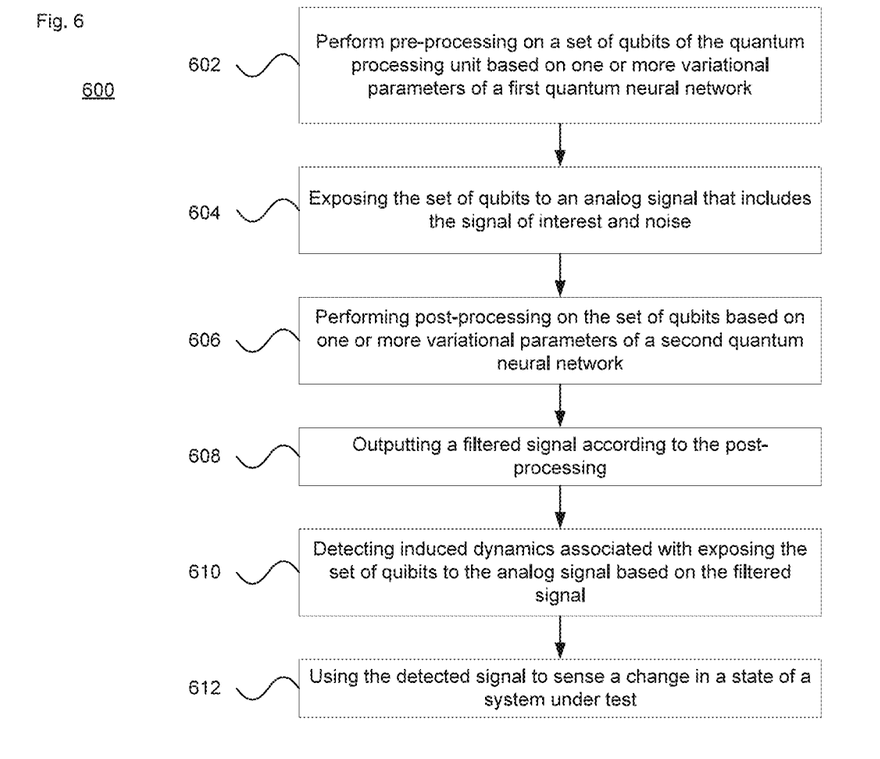
FIG. 6 illustrates a method in accordance with aspects of the disclosure.

FIG. 6 illustrates an example operational method 600 for quantum machine perception according to the above techniques. At block 602, the system performs pre-processing on a set of qubits of the quantum processing unit based on one or more variational parameters of a first quantum neural network. The first quantum neural network is selected to prepare entangled states that are sensitive to a signal of interest. At block 604, after pre-processing, the set of qubits is exposed to an analog signal that includes the signal of interest and noise. At block 606, post-processing is performed on the set of qubits based on one or more variational parameters of a second quantum neural network. The post-processing filters out at least some of the noise of the analog signal. At block 608, a filtered signal is output as a result of the post-processing. At block 610, the process further includes detecting induced dynamics associated with exposing the set of qubits to the analog signal based on the filtered signal. And at block 612, the detected induced dynamics are used to sense a change in a state of a system under test.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method of performing processing of sensor data from a system under test using a quantum processing unit, the method comprising:

performing pre-processing, using a first quantum neural network of the quantum processing unit, on a set of qubits of the quantum processing unit based on one or more variational parameters of the first quantum neural network, the first quantum neural network being selected to prepare entangled states that are sensitive to a signal of interest representing a state of the system under test, wherein the set of qubits is configured to process the sensor data from the system under test and the system under test is external to the quantum processing unit;

after pre-processing, exposing the set of qubits to an analog signal, the analog signal including the signal of interest and noise;

after exposing the set of qubits, performing post-processing, using a second quantum neural network of the quantum processing unit that is different from the first quantum neural network, on the set of qubits based on one or more variational parameters of the second quantum neural network, the post-processing filtering out at least some of the noise of the analog signal and outputting a filtered signal;

detecting induced dynamics associated with exposing the set of qubits to the analog signal based on the filtered signal; and using the detected induced dynamics to sense a change in the state of the system under test.

2. The method of claim 1, wherein the pre-processing includes setting the first quantum neural network to a starter state.

3. The method of claim 2, wherein the starter state is a unentangled product state.

4. The method of claim 1, wherein the exposing introduces additional noise that is correlated between qubits.

5. The method of claim 4, wherein the second quantum neural network is selected to exploit any correlation to isolate and amplify the signal of interest while filtering out at least some of the noise including the additional noise.

6. The method of claim 1, wherein the second quantum neural network is selected to be different from the first quantum neural network.

7. The method of claim 1, wherein exposing the set of qubits to the analog signal includes performing one or more intra-processing exposure phases.

8. The method of claim 7, wherein the one or more intra-processing exposure phases include performing multiple exposures of the set of qubits to the analog signal.

9. The method of claim 7, wherein the one or more intra-processing exposure phases is a plurality of intra-processing exposure phases, and each intra-processing exposure phase utilizes a different quantum neural network.

10. The method of claim 7, wherein the one or more intra-processing exposure phases each applies a different filter to the analog signal.

11. The method of claim 1, further comprising training the first and second quantum neural networks in accordance with one or more training signals.

12. The method of claim 11, wherein the training includes defining a loss function associated with one or more hidden parameters of a selected signal.

13. The method of claim 11, wherein the first and second quantum neural networks are trained concurrently.

14. The method of claim 11, wherein the training is performed according to a classical optimization process.

15. The method of claim 1, wherein the set of qubits includes a group of computational qubits and a group of sensing qubits.

16. A quantum processing system comprising:

a first quantum neural network selected to prepare entangled states that are sensitive to a signal of interest representing a state of a system under test external to a quantum processing unit, the signal of interest corresponding to at least one of magnetometry data, electric field data, optomechanical data, gravitometer data, accelerometer data, and quantum radar data;
a second quantum neural network that is different from the first quantum neural network; and
the quantum processing unit having a plurality of qubits configured to process sensor data corresponding to the signal of interest, the plurality of qubits being configured to process the sensor data by:
performance of pre-processing, using the first quantum neural network, based on one or more variational parameters of the first quantum neural network;
after pre-processing, exposure to an analog signal including the signal of interest and noise; and
after exposure, performance of post-processing, using the second quantum neural network, based on one or more variational parameters of the second quantum neural network, wherein the post-processing filters out at least some of the noise of the analog signal and outputs a filtered signal;
wherein the quantum processing system is configured to:
detect induced dynamics associated with exposing the plurality of qubits to the analog signal based on the filtered signal; and
use the detected induced dynamics to sense a change in the state of the system under test.

17. The quantum processing system of claim 16, wherein the second quantum neural network is selected to exploit any correlation to isolate and amplify the signal of interest while filtering out at least some of the noise.

18. The quantum processing system of claim 16, wherein the second quantum neural network is selected to be different from the first quantum neural network.

19. The quantum processing system of claim 16, wherein the plurality of qubits includes a group of computational qubits and a group of sensing qubits different than the group of computational qubits.

20. The quantum processing system of claim 16, wherein the quantum processing system is configured to train the first and second quantum neural networks in accordance with one or more training signals.

21. The method of claim 1, wherein the pre-processing includes preparing, using the first quantum neural network, a Greenberger-Horne-Zeilinger (GHZ) state.

* * * * *